United States Patent
Krueger et al.

[11] Patent Number: 5,762,164
[45] Date of Patent: Jun. 9, 1998

[54] OIL PUMP FOR A VARIABLE SPEED HERMETIC COMPRESSOR

[75] Inventors: Manfred Krueger; Dietmar Erich Bernhard Lilie, both of Joinville, Brazil

[73] Assignee: Empresa Brasileira De Compressores S/A - Embraco, Joinville, Brazil

[21] Appl. No.: 737,325

[22] PCT Filed: Apr. 4, 1994

[86] PCT No.: PCT/BR94/00009

§ 371 Date: Mar. 24, 1997

§ 102(e) Date: Mar. 24, 1997

[87] PCT Pub. No.: WO95/27138

PCT Pub. Date: Oct. 12, 1995

[51] Int. Cl.$^6$ ............................ F01M 1/00
[52] U.S. Cl. ............ 184/6.18; 184/6.16; 184/12; 184/63; 310/54; 310/90
[58] Field of Search ............... 184/6.18, 6.16, 184/11.2, 11.1, 12, 61, 63; 310/54, 90; 418/94

[56] References Cited

U.S. PATENT DOCUMENTS

| | | |
|---|---|---|
| 3,103,180 | 9/1963 | Hyde . |
| 4,400,142 | 8/1983 | Ohlson, Jr. ............... 184/6.18 |
| 4,478,559 | 10/1984 | Andrione et al. . |
| 4,614,123 | 9/1986 | Tompkins ............... 184/6.18 |
| 4,762,471 | 8/1988 | Asanuma et al. ......... 184/6.18 |
| 4,762,477 | 8/1988 | Hayano et al. .......... 418/94 |
| 4,764,699 | 8/1988 | Nold ........................ 310/89 |
| 5,586,876 | 12/1996 | Yasnnascoli et al. ..... 418/94 |

FOREIGN PATENT DOCUMENTS

| | | |
|---|---|---|
| 0 433 212 A1 | 6/1991 | European Pat. Off. . |
| 2204233 | 5/1974 | France . |

*Primary Examiner*—Thomas E. Denion
*Attorney, Agent, or Firm*—Darby & Darby

[57] ABSTRACT

Oil pump for a variable speed hermetic compressor, comprising: a hermetic shell (1), which defines a lubricant oil sump (2) at its bottom and which lodges therewithin a cylinder block (3), supporting a vertical eccentric shaft (5), which carries an electric motor rotor (8), said eccentric shaft (5) being provided with at least one oil channel (9), having an upper end (9a) opened to the external part of the upper median portion of the eccentric shaft (5), said eccentric shaft (5) supporting at its lower end (5b) a pump rotor (10); at least one oil conducting channel (20), which is machined to the body of said rotor (8) and which presents a lower end opening (20b) facing the pump rotor (10) and an upper end opening (20a) for oil discharge to said oil channel (9), said oil conducting channel (20) having at least the part of its length, that includes the upper end opening (20a), radially spaced in relation to the eccentric shaft (5); a stationary oil collecting means (30), which is attached to the cylinder block (3) and which is provided with an annular region for receiving all the oil coming from each oil conducting channel (20); and at least one lubricant oil feeding means (31) that discharges oil to the oil channel (9).

6 Claims, 3 Drawing Sheets

OIL PUMP FOR A VARIABLE SPEED HERMETIC COMPRESSOR

BACKGROUND

1. Field of the Invention

The present invention refers to an oil pump for variable speed hermetic compressors of the reciprocating type, and more particularly, those having a vertical shaft and used in refrigerators and freezers.

2. Background of the Invention

Refrigeration appliances require that their respective hermetic compressors supply the exact refrigerating capacity necessary to remove the internal heat from the medium to be refrigerated. As the refrigerating capacity is proportional to the flow of refrigerant mass pumped by the compressor, the refrigerating capacity is varied by changing the mass flow pumped by the compressor. A common technique of continuously obtaining variations in mass flow employs varying the compressor motor speed.

There are studies indicating that variable speed compressors require an operative range from 15 Hz to 100 Hz, i.e., between 900 and 6000 rpm, in order to achieve good refrigerating performance. Such speed variations affect the mechanical operation of the compressor, specially the operation of the oil pump, which conducts oil to the bearings of the compressor mechanism and other regions requiring lubrication, such as the connecting rod and piston.

Centrifugal pumps are the most common oil pumping mechanisms used in hermetic compressors, both for their low cost and adequate operation in the range of from 3000 to 3600 rpm, which results from the frequency of the electrical network. Nevertheless, such mechanisms become inoperative at low rotational speeds.

Conventional oil pumps of the centrifugal type, such as the one illustrated in FIG. 1, and presently in use, are not capable of pumping the oil to the bearings when the compressor operates at low speeds. The operative limitations of the centrifugal pump are related to the difference between its larger radius (R) and its smaller radius (r), as can be seen in the equation below which governs the behavior of the centrifugal pump:

$$\omega = [(2 \cdot g \cdot h)/(R^2 - r^2)]^{1/2}$$

where "h" is the required pumping height, from the oil level up to the bearings; "g" is the gravitational constant; "R" is the larger radius of the pump; "r" is the smaller radius and "ω" is the angular speed (rad/sec).

The search for an increase in the oil pumping efficiency in such compressors by simply increasing the larger radius (R) of the pump is unfeasible, because such an increase, which must be substantial to achieve the desired pumping characteristics, also affects the external diameter of the compressor shaft and, consequently, the manufacturing process for the compressor and the performance thereof caused by greater losses due to friction. It should be observed that small diameter alterations are not sufficient to achieve the necessary degree of centrifugal pumping at rotational speeds close to or less than 900 rpm.

Conventional centrifugal pumps which utilize a vertical or horizontal shaft and are widely used in hermetic compressors, are disclosed in U.S. Pat. No. 4,478,559 and U.S. Pat. No. 4,569,639; and DT 209,877 pumps are inoperable, or work inefficiently, at rotational speeds less than about 900 rpm.

U.S. Pat. No. 4,097,185 describes a centrifugal pump, which operates in stages and through which the whirl of oil at the bottom of the compressor sump can be reduced. A lower cavity in the pump allows the oil intake to the pump and its smaller radius (r) as a function of the desired oil flow. As this smaller radius (r) increases, the performance of the pump is reduced.

Other forms of centrifugal pumps are described in patent documents DT 209,936 and DT 2,502,567. These pump configurations use a blade that is press fitted into the pump shaft and function as an impeller for the oil.

The patent FR 2,204,233 describes a conventional centrifugal pump, which is mounted to an eccentric shaft of a compressor. The pump mechanism is disposed at the lower part of the compressor body, and the motor is disposed at the upper part. This configuration allows the oil to be pumped at a slightly lower rotation speed, due to a reduction in the required pumping height. Nevertheless, the minimum rotation speed still remains much higher than the desired minimum value (about 900 rpm).

Another solution for oil pumping used in horizontal shaft compressors employs an extension provided at the end of the pump shaft in the form of a tubular curved portion, with the upper end of the shaft attached to the stator of the motor. The free end of the shaft is immersed in the lubricant oil sump of the compressor. The tubular curved portion houses a pump rotor, pumping defined by a coiled spring having overlapping coils. An upper end of the spring is connected to the shaft end of the compressor and a conical lower end is immersed in the lubricant oil. Although this construction provides helical tubes to conduct the oil, pumping of oil to the eccentric shaft and, consequently, to the other parts of the compressor requiring lubrication, is facilitated by centrifugal force, as in the conventional vertical shaft compressors provided with an open conical free end. This solution does not provide good efficiency at low rotational speeds and also suffers the drawback in that it can only be used in horizontal shaft compressors.

In another solution described in Applicant's copending patent application, the increase in the pumping efficiency is achieved through a pump rotor having ascending helical grooves which are superficially provided along a portion of the longitudinal extension of said rotor. This solution, although providing efficient lubrication at rotational speeds 600 rpm lower than those achieved with conventional oil pumps, provides the pumping effect by mechanically dragging the oil along the helical grooves of the pump rotor.

SUMMARY OF THE INVENTION

In view of the above, it is an object of the present invention to provide a centrifugal oil pump for variable speed reciprocating hermetic compressors having a vertical shaft, with pump performance similar to that obtained by pumps of mechanical dragging, i.e., for rotational speeds around 600 rpm.

It is another object of the present invention to provide an oil pump as discussed above, which provides improved pumping capacity without having to redimension the shaft and cylinder block components.

It is yet another object of the present invention to provide an oil pump which is simple to manufacture and assemble.

It is still another object of the present invention to provide an oil pump that does not whirl oil in the sump of the compressor, as is common with conventional centrifugal oil pumps.

The above and other objectives and advantages of the present invention are attained with an oil pump for a variable speed hermetic compressor of the type including: a hermetic shell defining a lubricant oil sump at a bottom of the shell and in which is disposed a cylinder block supporting a vertical eccentric shaft, the shaft including a rotor of an electric motor, the eccentric shaft being provided with at least one oil channel, having a lower end in fluidic communication with the lower end of the eccentric shaft and an upper end opened to an external part of an upper median portion of the eccentric shaft, at a region covered by a supporting bearing.

The oil pump of the present invention further comprises: at least one oil conducting channel, which is machined to the stator body of the electric motor, and which includes a lower end opening for receiving the oil centrifuged by a pump rotor, and an upper end opening for oil discharge to the oil channel, the oil conducting channel having at least the part of the length thereof which includes the upper end opening, radially spaced in relation to the eccentric shaft by a distance that is larger than the radius of the eccentric shaft; a stationary oil collecting structure attached to the cylinder block and provided with an annular region for receiving oil coming from the upper end opening of each oil conducting channel; and at least one lubricant oil feeding provision which discharges oil to the oil channel.

The oil pump as defined above provides adequate pumping capacity at rotational speeds around 600 rpm, but can also be used at rotational speeds above 6000 rpm without impairing its operation. The oil pump can be used in compressors mounted in a conventional manner, i.e., with the motor disposed at the lower part of the body.

BRIEF DESCRIPTION OF THE DRAWINGS

The present invention will now be described below with reference to the attached drawings, in which.

DETAILED DESCRIPTION OF THE PREFERRED EMBODIMENTS

Figure 1:
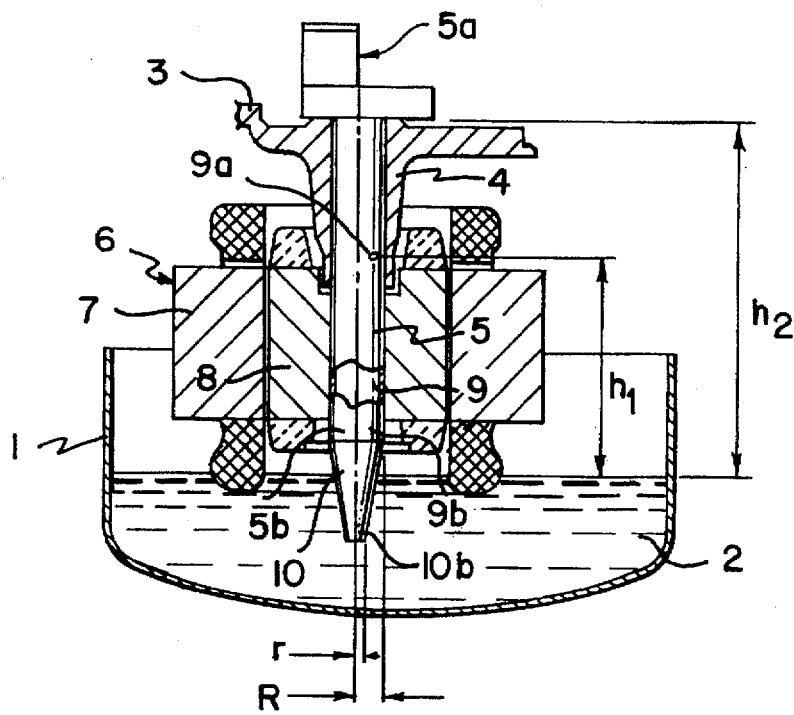
FIG. 1 illustrates a prior art oil pump in a longitudinal diametral section view mounted inside a hermetic compressor and having the dimensions $h_1$, $h_2$, R and r.

With reference now to the drawing figures described above, a variable speed hermetic compressor having a vertical shaft comprises: a hermetic shell 1, defining a lubricant oil sump 2 at the bottom of and housing shell 1 therewitthin: a cylinder block 3, incorporating a bearing 4 for supporting a vertical eccentric shaft 5, provided with an upper end 5a and a lower end 5b, and with an electric motor 6, having a stator 7, attached to the cylinder block 3 and a rotor 8, attached to a portion of the eccentric shaft 5 located below the bearing 4 and defining an eccentric shaft-rotor assembly. The eccentric shaft 5 is provided with at least one oil channel 9, having a lower end 9b opened to the lower end 5b of the eccentric shaft 5 and an upper end 9a opened to the external part of the upper median portion of the eccentric shaft 5 at the region of the bearing 4. The eccentric shaft 5 has a pump rotor 10 attached to the lower end 5b of shaft 5. Rotor 10 has a lower end 10b immersed in the oil mass provided in the sump 2.

Figure 2A:
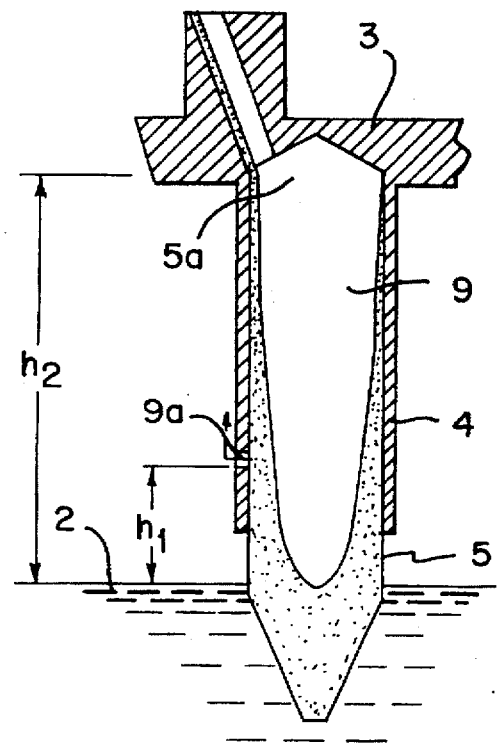
FIGS. 2a and 2b illustrate, respectively, an enlarged sectional view of a prior art oil pump operating at a normal angular speed (2a) and a reduced speed (2b)
Figure 2B:
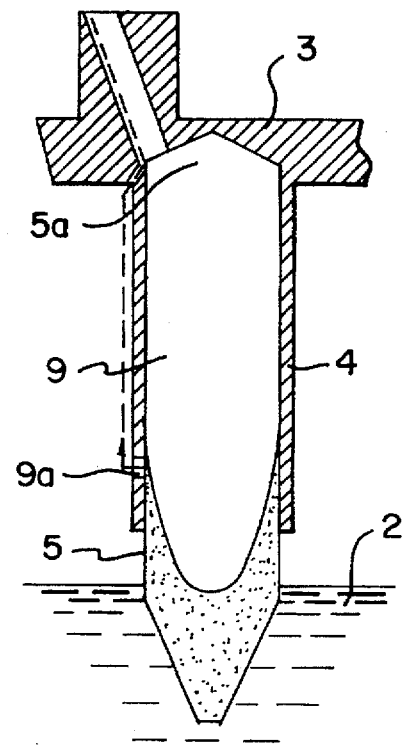

In these compressors, as illustrated in FIGS. 2a and 2b, lubrication of the piston and other components is facilitated through centrifugation, by the rotation of the eccentric shaft-rotor assembly. Normal operation of the compressor is about 3000–3600 rpm.

Nevertheless, at low rotational speeds typically lower than 2000 rpm, lubrication of these components becomes marginal, or occasionally does not occur at all, since the oil column formed by centrifugal effects inside the oil channel 9 no longer reaches the upper end 9a of oil channel 9.

In such compressors, the efficiency of the oil pump is a function of the relationship between its smaller diameter (radius r), immersed in the sump 2, and its larger diameter (radius R). If the differences between r and R are small as discussed in the foregoing, the lubricating force of the oil pump will be lower.

According to the present invention, the increase in pumping capacity using centrifugal oil pumps is achieved with an increase in the difference between the smaller radius r relative to the opening of an oil inlet lower nozzle defined at the lower end 10b of the pump rotor 10, and the larger radius R, maximally spaced from the geometric axis of the oil pump. The larger radius R is obtained by machining at least one ascending oil conducting channel 20 in the body of the rotor 8, communicating the oil intake lower nozzle 10b of the pump rotor 10 with a stationary oil collecting means 30, provided with a feeding means 31 and disposed at a region of the eccentric shaft-rotor assembly located below the upper end 9a of the oil channel 9 of the eccentric shaft 5, through which the oil pumped from the sump 2 is led to the bearing 4.

With this radius increase, the oil pumping to the height ho, where the upper end 9a of the oil channel 9 is located, may occur with a lower rotational speed of the motor. This allows the compressor to operate at rotational speeds lower than those conventionally required for the same oil pumping at height $h_1$.

Each oil conducting channel 20 includes an oil outlet upper end opening 20a and an oil inlet lower end opening 20b, which communicate, respectively, with the stationary oil collecting means 30 and the oil inlet lower nozzle 10b of the pump rotor 10. In the illustrated embodiment, the upper end opening 20a incorporates an oil pouring nozzle 23, which constantly discharges the oil to the collecting means and whose construction will be described ahead.

Figure 3:
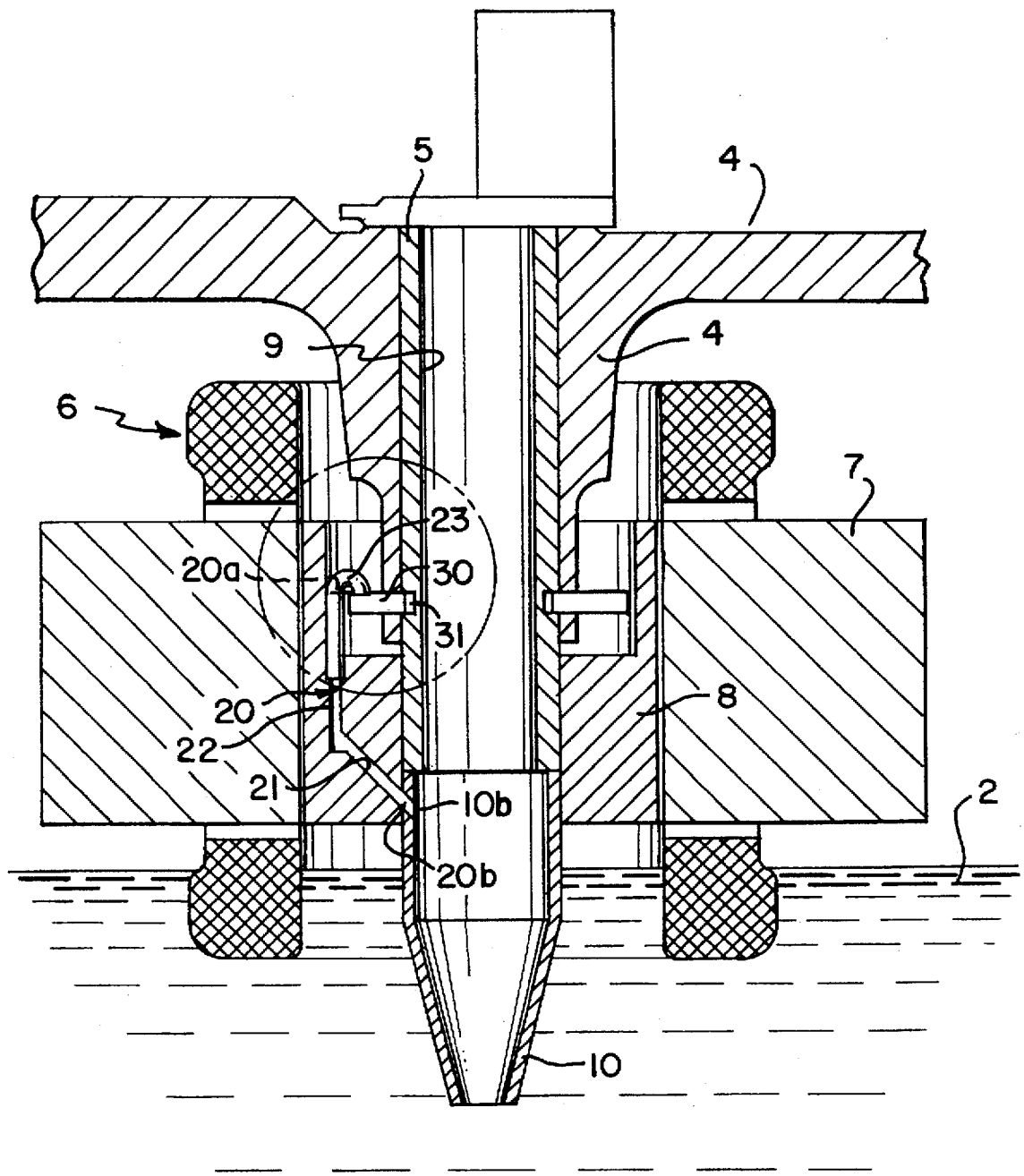
FIG. 3 is a longitudinal sectional view of the inside of a hermetic compressor with an oil pump of the present invention.
Figure 4:
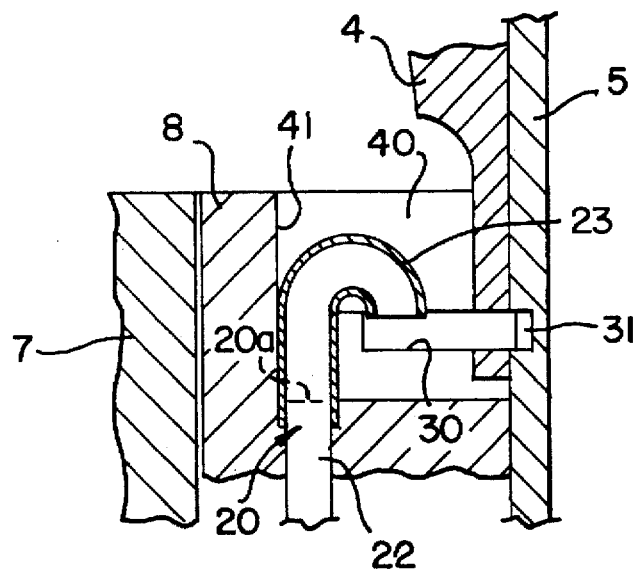
FIG. 4 is an enlarged sectional view illustrating the region where the oil passes from the rotor conducting channel to the oil collecting means.

In a preferred embodiment of the present invention illustrated in FIG. 3, the oil conducting channel 20 comprises an inclined lower portion 21 and a median portion 22, parallel to the eccentric shaft 5, with the median portion 22 occupying a substantial fraction of a height h of the rotor 8. In this embodiment, oil conducting channel 20 is defined at a median portion of the rotor 8 thickness. The length of oil conducting channel 20 is defined as a function of the constructive characteristics of the compressor.

The oil conducting channel 20 may be machined adjacent to the internal wall of the rotor 8. The wall is in contact with the external wall of the eccentric shaft 5, such that there is no substantial increase in the action of the centrifugal force over the oil being pumped to the upper end 9a of the oil channel 9, due to an insignificant increase in the larger radius R of the oil pump.

According to the embodiment illustrated in FIG. 3, the rotor 8 includes, at its upper portion and from a median height, an end axial recess 40 which is concentric to the eccentric shaft 5 and which defines a housing for the oil collecting means 30. The axial recess 40 includes a lateral wall 41, spaced from the geometric axis of the oil pump by a distance that usually corresponds to the larger radius R.

In an alternative embodiment of the present invention, the stationary oil collecting means 30 is in the form of an annular tray, having a profile defined as a function of the space available to allow its installation adjacent to the bearing 4. The stationary oil collecting means 30 is attached, by appropriate structure to the lower portion of the bearing 4, so as not to rotate together with the eccentric shaft-rotor assembly. In this construction, the feeding means 31 is defined by an opening, provided at the lower end of the bearing 4 and communicating the stationary oil collecting means 30 with an annular channel 32 defined at the external wall of the eccentric shaft 5, to continuously supply oil to the eccentric shaft 5 during compressor operation. The oil that reaches the external wall of the eccentric shaft 5 is then transported to the upper and lower portions of the bearing 4 through helical grooves provided at the external surface of the eccentric shaft 5.

In another alternative embodiment, the feeding means 31 is defined by a channel associated with the stationary oil collecting means 30 and introduced into the opening, thereby allowing attachment of stationary oil collecting means 30 to the bearing 4. The channel may, alternatively, just surround the eccentric shaft 5 when the end of the bearing is at a higher level.

During the operation of the compressor, the oil is centrifuged from the sump 2 to the oil conducting channel 20, running through the internal walls of the pump rotor 10 during the rotation of the eccentric shaft-rotor assembly, until reaching an oil conducting orifice 11 defined in an upper portion of the lateral wall of the pump rotor 10 and permanently communicating with the lower end opening 20b of the oil conducting channel 20. This permanent communication makes the pumped oil be spaced further from the geometric axis of said oil pump, thereby increasing the centrifugal force that is acting on the oil and allowing the oil to reach a higher pumping height with a lower motor rotational speed. The oil that is being pumped is conducted to the oil pouring nozzle 33, which constantly discharges the oil to the stationary oil collecting means 30 for temporary storage of the oil until the oil is released to the feeding means 31 and, consequently, to the eccentric shaft 5.

Though not illustrated, both the collecting means 30 and feeding means 31 may include inclined oil conducting surfaces, so that the oil received from the oil pouring nozzle 33 can reach the inside of the eccentric shaft 5 by gravitational dragging.

The oil supplied to the collecting means 30 is constantly fed to the eccentric shaft 5 through the feeding means 31 by gravitational dragging. As the eccentric shaft 5 rotates this oil is conducted by the mechanical dragging of the lubricating grooves to the upper end 9a of the oil channel 9, from where the oil is distributed to the bearing and other components.

The use of a stationary collecting means 30 is necessary to avoid loss in the pumping yield, caused by oil which follows a path in the direction opposite to that of the centrifugal force acting on the oil conducting channel 20.

To assure lubrication of the region between the eccentric shaft 5 and bearing 4 when the feeding means 31 is positioned above the lower end of bearing 4 at a distance from the lower end in such a way that the oil adjacent to the opening of the feeding means 31 does not reach the end, the internal surface of said oil channel 9 is provided with at least one descending helical slot, which conducts a fraction of the oil through the feeding means 31 to the region of the bearing 4.

Although not illustrated, the present invention may be provided with at least one second oil conducting channel 20 machined to the body of the rotor 8, preferably opposite to the oil conducting channel 20 described above, or with a plurality of oil conducting channels 20 which are angularly spaced from each other at a balanced disposition throughout the body of the rotor 8. The number of oil conducting channels machined in the rotor 8 is defined in such a way as to not impair the rigidity of the rotor or the motor yield, which is a function of the amount of iron found in the rotor. Nevertheless, small portions of iron removed therefrom do not change significantly the rotor properties.

Figure 5:
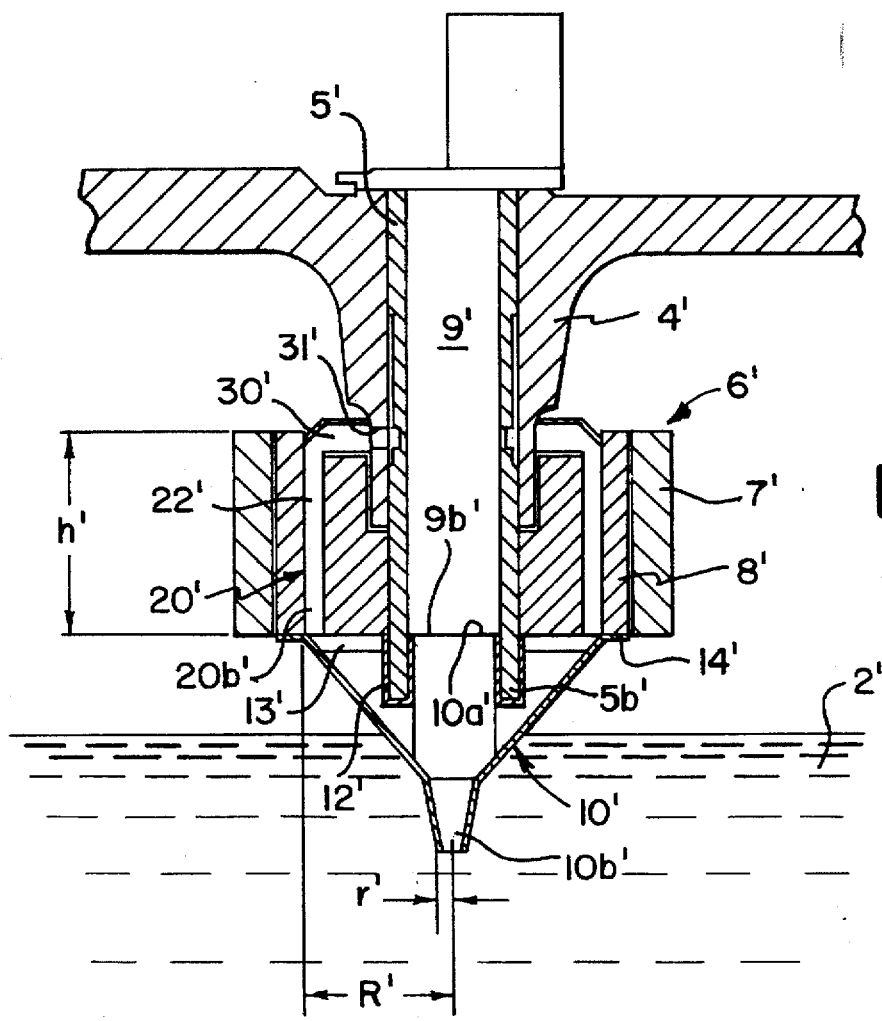
FIG. 5 illustrates another embodiment of the oil pump of the present invention.

In another embodiment of the present invention, as illustrated in FIG. 5, the oil conducting channel 20 is configured in the form of a pair of through bores, which are disposed opposite to each other and machined in respective portions of the rotor 8 close to the adjacent external lateral wall thereof and parallel to the eccentric shaft 5, a sufficient distance from the wall in order to avoid impairing the integrity of the rotor 8 during the machining operation of the conducting channels.

In this embodiment, the inclined portion of the oil conducting channel 20 described above is provided in a pump rotor 10' of a particular construction. The pump rotor 10' of an inverted frusto-conical shape presents an open round upper end 10a', having a diameter defined so as to surround the lower end opening of the oil conducting channels 20 machined in the rotor 8, thus permitting constant fluid communication with the oil sump 2, oil conducting channels 20 and a lower nozzle 10b', immersed in the oil sump 2.

The adaptation of either of the above described pump rotors 10, 10' to the eccentric shaft-rotor assembly may be achieved in a conventional manner, such as discussed in Brazilian patent PI 9201761. For the construction of a pump rotor such as that illustrated in FIG. 5, the adaptation is made by fitting an annular projection 12' concentric to the eccentric shaft 5 and surrounding a lower portion, projecting from said eccentric shaft 5, relatively to the rotor-motor assembly.

The strength of the pump rotor 10' is enhanced by radial ribs 13', which internally communicate at least the upper nozzle 10a ' of said pump rotor 10' with the annular projection 12'. In another embodiment, such communication is facilitated through radial walls extending from the radial ribs.

The pump rotor 10' may further include an annular peripheral flange 14', which is continuous and surrounds the tipper end edge of the pump rotor 10, and which is seated against the lower portion of the rotor 8. The annular flange acts as an element for attaching the pump rotor 10 to the rotor 8.

In the embodiment illustrated in FIG. 5, injection of the oil pumped through the oil conducting channel 20 towards the collecting means 30 is achieved through the provision of a respective oil pouring nozzle 23 in each oil conducting channel 20, in the form of an annular duct 20, which communicates each oil conducting channel 20 with the collecting means 30 as described above.

Although not illustrated, it is possible to have oil conducting channels which are machined in the rotor and which include a linear or stepped gradual increase in radius from the oil inlet lower end opening 20b of said conducting channels.

We claim:

1. An oil pump for a variable speed hermetic compressor including: a hermetic shell, which defines a lubricant oil sump at a bottom of said shell and in which is disposed a cylinder block, said cylinder block supporting a vertical eccentric shaft, said shaft including a rotor of an electric motor connected thereto, said rotor having a thickness, said eccentric shaft being provided with at least one oil channel, having a lower end in fluidic communication with said lower end of said eccentric shaft and an upper end opened to an external part of an upper median portion of said eccentric shaft, at a region of a bearing, said eccentric shaft supporting a pump rotor at a lower end of said eccentric shaft, which pumps the lubricant oil from said sump to said open upper end of said oil channel, said oil pump further comprising: at least one oil conducting channel, which is machined to the body of a stator of said electric motor and which includes a lower end opening for receiving oil centrifuged by a pump rotor and an upper end opening for oil discharge to said oil channel, said at least one oil conducting channel being elongated and having at least a part of said length including said upper end opening defined at a median portion of said rotor thickness; a stationary means for collecting oil, which is attached to said cylinder block and which is provided with an annular region for receiving oil coming from said upper end opening of said at least one oil conducting channel; and at least one means for feeding lubricant oil that discharges oil from said oil conducting channel to said oil channel.

2. An oil pump as recited in claim 1, wherein said oil conducting channel includes at least a portion of an extension thereof parallel to said eccentric shaft.

3. An oil pump an as recited in claim 2, wherein said upper end opening is disposed at an axial extension of said oil conducting channel through said rotor.

4. An oil pump as recited in claim 2, wherein said lower end opening is provided at an inclined lower portion of said oil conducting channel.

5. An oil pump as recited in claim 2, wherein said pump rotor includes a lower end immersed in oil and an upper end in fluidic communication with said lower end opening of said oil conducting channel, said communication between said lower end and said upper end of said pump rotor being made through a continuous inverted conical surface.

6. An oil pump as recited in claim 1, wherein said upper end opening of said oil conducting channel defines an oil pouring nozzle, which discharges the oil to said stationary means for collecting oil.

* * * * *